ABSTRACT# United States Patent [19]

Brueggemann et al.

[11] 4,205,028

[45] May 27, 1980

[54] FORMING PROTECTIVE SKIN ON INTRICATELY MOLDED PRODUCT

[75] Inventors: Walter H. Brueggemann, Chagrin Falls; John A. Brenner, Independence, both of Ohio

[73] Assignee: Ferro Corporation, Cleveland, Ohio

[21] Appl. No.: 2,658

[22] Filed: Jan. 11, 1979

[51] Int. Cl.$^2$ .......................... B29C 5/00; B29C 5/08; B29D 9/00

[52] U.S. Cl. ...................... 264/24; 264/126; 264/250; 264/255; 264/267; 264/269; 264/309; 264/338

[58] Field of Search ............... 264/126, 250, 255, 267, 264/269, 309, 338, 24, 347; 427/27, 195; 260/861, 873

[56] References Cited

U.S. PATENT DOCUMENTS

| | | |
|---|---|---|
| 2,698,311 | 12/1954 | Robinson .................. 260/861 |
| 3,061,492 | 10/1962 | Singleton et al. ............ 428/428 |
| 3,278,656 | 10/1966 | Dicks et al. ................ 264/22 |
| 3,673,296 | 6/1972 | Timko ..................... 264/126 |
| 3,694,530 | 9/1972 | Wolfe ..................... 264/48 |
| 3,917,790 | 11/1975 | Oswitch et al. ............. 264/267 |
| 3,949,125 | 4/1976 | Roberts ................... 264/250 |
| 3,954,901 | 5/1976 | Watanabe et al. ............ 427/195 |
| 3,966,870 | 6/1976 | Vecchiotti ................. 264/255 |
| 4,001,153 | 1/1977 | Ogino ..................... 427/29 |
| 4,012,363 | 3/1977 | Brüning et al. ............. 427/185 |
| 4,048,257 | 9/1977 | Stevenson ................. 260/861 |
| 4,074,006 | 2/1978 | Boldebuck ................. 427/195 |
| 4,102,944 | 7/1978 | Fukuyama et al. ............ 260/861 |
| 4,133,843 | 1/1979 | Isaksen et al. ............. 427/195 |
| 4,135,009 | 1/1979 | Mercurio .................. 427/195 |

*Primary Examiner*—W. E. Hoag
*Attorney, Agent, or Firm*—Wilson, Fraser, Barker & Clemens

[57] ABSTRACT

A molding process, resinous formulations for use in the process, and the resulting products are disclosed characterized in that the product comprises mainly a bulk or fill resinous body having a film or skin of a cross-linked polyester resin formed about the body. Even though the body has intricate curving surface contours, the film is smooth and free of surface tears and blemishes. The product is molded by first spraying formulated, dry particles of a partially cured polyester resin against a hot female mold to cause the particles to fuse and flow and form a substantially continuous skin or film on the female mold. Thereafter, the bulk resin is added and the mold is heated to cure the polyester resin as well as the bulk resin and to interreact the bulk and polyester resins together to mold the bulk resin with a film of the polyester resin.

15 Claims, No Drawings

FORMING PROTECTIVE SKIN ON INTRICATELY MOLDED PRODUCT

BACKGROUND OF THE INVENTION

It has been the practice to mold sheet molding compound, commonly referred to in the art as SMC, in female molds. SMC molding is widely used for high volume production of large, rigid plastic parts. For economic reasons, the bulk resin that fills the mold is usually of the less expensive resins and has inferior physical properties, such as poorer chemical resistance, as compared to the more costly resins. The bulk or fill resins in SMC molding especially have poor surface quality and are apt to exhibit blemishes, such that the molded products esthetically fail to meet consumer acceptance. For example, SMC moldings are apt to have sink marks, porosity, waviness, pits, dimples, and the like.

To overcome these faults, it has been suggested to paint the SMC molded products. This, however, only masks the more desirable resinous appearance. Also, painting does not effectively fill the more serious sink marks. It is, therefore, customary to inspect all parts and recycle defective ones through additional sanding, painting and further inspection until an acceptable appearance is obtained.

It has also been suggested to apply a coat about a previously molded SMC product which can be of the more expensive type of resin and thereby furnish the desired physical properties, at least to outward appearance and exposure. One process following this technique has been to compression mold an SMC product, open the mold, pour about the product a resinous coating compound, and then reclose the mold for a second heating or cure operation.

However, this technique has not been entirely satisfactory. After the initial compression molding and when the mold is opened to apply the resinous coating, it is necessary that the bulk resin portion does not unduly leave the mold or, if it does, that the molded bulk resin re-seats itself satisfactorily for the second heating step. If the re-seating is off, the coat covering is apt to be uneven and some areas of the SMC molding may not even receive some of the resin designed to form the coat. Further, the opening and closing of the mold tends to trap flash into the mold.

Still further, the described technique especially does not work well when the mold has sharp bends or intricate curving surface contours. In this case, tears occur in the after-applied coat as it attempts to adapt itself to irregular surface contours of the mold and draft of the mold press. In such cases, blemishes, and other defects may still appear.

In U.S. Pat. No. 3,917,790 to Oswitch et al, a dry, resinous mat which may be reinforced with fibers is cut to size and lined along a female mold. A bulk resin is then added to the mold which presses the mat into conformity with the mold shape. Thereafter, the resins are finally cured by heat.

U.S. Pat. No. 3,791,899 to Walters discloses placing a layer of plastic powder on a heated surface of a mold, heating the layer to make it tacky, and distributing compatible plastic pellets over the tacky layer. The pellets are heated until they soften. Upon cooling the mold, the pellets adhere to each other and to the layer.

U.S. Pat. No. 3,954,901 to Watanabe et al discloses a mixture of a polyester resin, a melamine and a blocked isocyanate resin sprayed and used as a powder paint.

U.S. Pat. No. 3,694,530 to Wolfe teaches the use of a solution of polyester resin to form a film for polyurethane foam.

SUMMARY OF THE INVENTION

A principal object of the present invention is to provide an improved molding process, polyester formulations for use in the process, and the resulting molded products, all characterized in that such products comprise a resinous body having a polyester film or skin covering the body.

In one form, a reactive, substantially dry powder of a partially cured, cross-linking polyester resin is sprayed onto a mold sufficiently hot to fuse and flow the powder and cause it to coalesce as a substantially continuous film or skin lining the mold. The polyester powder preferably contains additives aiding its flow and subsequent chemical reaction. After a filler or bulk resin is added to the mold, the mold is again heated to cure the bulk resin and the polyester resin of the film as well as, preferably to interreact the two resins together into one integral product having a smooth, attractive outer polyester skin.

The process is particularly adapted to molds having bends and intricate, compound curving surface contours. Any matched mold parts may be used. Usually female molds are used, although the invention is also adapted to male molds. The molded product is smooth surfaced and the outer adhering coat or skin of the polyester resin has little or no tears or blemishes, even on molded products of highly irregular configurations.

The polyester resin which is applied against the mold is preferably one formed by reacting an organic glycol of about 2 to about 12 carbon atoms with a dicarboxylic acid having about 2 to about 16 carbon atoms. Preferably, the polyester resin is cross-linked as well as chemically reacted with the bulk resin. Accordingly, the polyester powder usually contains a cross-linking agent, often unsaturated, as well as a catalytic amount of a catalyst, such as a peroxide catalyst. The polyester resin particles may contain still other additives such as a flow agent, an inorganic filler, a pigment, and the like.

DESCRIPTION OF THE PREFERRED EMBODIMENTS

In disclosing the present invention more particularly, polyester formulations which may be used to define a film or skin of a molded product are initially described, followed by a detailed account of the molding process itself and the product resulting from the process.

POLYESTER FORMULATIONS

As indicated, a polyester formulation useful in the present invention is one adapted to be applied to a hot mold surface to form a film covering for a resinous body molded therein. The polyester formulation as herein contemplated is a reaction mixture in particulate form, the particles comprising a partially cured, cross-linking polyester resin, an unsaturated, organic cross-linking monomer, a catalytic amount of a peroxide catalyst, and a sufficient amount of a flow agent effective to cause the particles, when fused, to flow and form a substantially continuous coat on the mold surface. As used here and in the claims, the term "partially cured cross-linking polyester resin" means that some esterification or cross-linking has taken place and that the resin is capable of further esterification or cross-linking.

The partially cured, curable polyester resins contemplated are those prepared by reacting a polyol, particularly a dihydric alcohol with a dicarboxylic acid or an hydride thereof. The polyol or dicarboxylic acid may be saturated or unsaturated, but the polyester stem formed by their esterification should be at least chemically reactive with a cross-linking monomer so as to form ultimately a cross-linked, thermoset polyester resin. In general, the polyester resins are formed by reacting an organic glycol of about 2 to about 12 carbon atoms with a dicarboxylic acid of about 2 to about 16 carbon atoms or with an anhydride thereof.

Among the polyols that may be used are ethylene glycol, propylene glycol, butylene glycol, diethylene glycol, triethylene glycol, hexylene glycol, 1, 4-cyclohexanedimethanol, hydrogenated bisphenol A, and the like. Cycloglycols may also be used such as 1, 2 cyclopentanediol, 1, 3 cyclopentanediol, 1, 3 cyclohexanediol, 4,4'-methylene-bis(cyclohexanol), and the like. Aromatic glycols may also be used such as xylene glycol.

Typical saturated acids or anhydrides thereof which may be used include phthalic acid, terephthalic acid, isophthalic acid, adipic acid, succinic acid, pimelic acid, glutaric acid, suberic acid, sebacic acid, azelaic acid, and the like. Typical unsaturated acids or anhydrides thereof which may be used are maleic, fumaric, methylmaleic, citraconic, and the like. The saturated and unsaturated dibasic acids may be jointly used as well.

Molecular weight is not critical to the practice of the invention. When the polyester particles are applied as hereinafter described to a mold surface, the polyester resins are only partially cured and susceptible to further cure. Subsequent to their application to a mold, the resins are finally cured, preferably to a thermoset state. In general, polyester resins suitable for the practice of the invention have a molecular weight in the range of about 800 to about 3,000 and an acid number of about 10 to about 40. The methods of preparing the resins do not form part of the present invention. They are well known in the art and many types of resins are available commercially.

Polyester resins that have been found to be especially useful in the practice of the invention are those formed by reacting a glycol selected from the class consisting of propylene glycol and neopentyl glycol with isophthalic acid.

The partially cured polyester resin is blended with a cross-linking unsaturated monomer which at least in the final cure reacts with linear polyester chains to cross-link them and thereby impart thermoset properties. The unsaturation of the monomer is usually ethylenic and especially terminal ethylenic as exemplified by a monomer selected from the group consisting of styrene, p-butylstyrene, vinyl toluene, methyl acrylate, methyl methacrylate, diallyl phthalate, acrylamide, diacetone acrylamide, divinyl phthalate, dimethyl fumarate, diethyl fumarate, diallyl chlorendate, diallyl melamine, oligomers thereof, and the like. While as much as 30% by weight of the cross-linker may be used, generally less than 20% by weight of the polyester resin is preferred.

A peroxide is preferably used to catalyze the reaction of the polyester to a thermoset state. Among peroxide catalysts that may be used are benzoyl peroxide, cumene hydroperoxide, acetyl peroxide, lauroyl peroxide, phthalic peroxide, di-tertiary butyl peroxide, diethyl peroxide, acetyl benzoyl peroxide, and the like. The amount of catalyst used is usually about 0.1% to about 8% by weight and, preferably, from about 0.5 to about 2% by weight of the combined polyester.

It is important that the polyester formulation includes a flow agent in an example amount of about 0.05% to about 10% by weight of the polyester. When the polyester particles strike the hot surface of the mold and fuse, not being yet thermoset, the flow agent aids the fused particles to flow and spread as a substantially continuous film over such surface. Acrylate-based flow agents, such as polyacrylic acid, are preferred. One preferred acrylate-based flow agent is sold under the trademark "Modoflow". However, silicone oils, polytetrafluoroethylene, soaps like zinc stearate, non-ionic, anionic, and cationic flow agents may be used as well. Useful non-ionic flow agents include butyl phenol monoether of a polyethylene glycol, dihexyl ester of sodium sulfosuccinic acid, polyoxyethylene sorbitan monoleate, sorbitan monopalmitate, sorbitan monostearate, sorbitan monooleate, ethylene oxide condensate of octyl phenol, and the like. Useful anionic flow agents include sodium dodecyl benzyne sulfonate, alkyl benzene sodium sulfonate, sodium lauryl sulfate, sodium lauryl sulfoacetate, sodium alkyl naphthalene sulfonate, and the like. Useful cationic flow agents include fluorinated alkyl quarternary ammonium iodides.

While polyester formulations and proportions are not critical, one general formula that has provided good results is in parts by weight:

| Polyester Resin | 75 to 175 |
| --- | --- |
| Cross-linking monomer | 75 to 125 |
| Peroxide catalyst | 2 to 8 |
| Flow agent | 2 to 10 |
| Filler | 0 to 60 |

As indicated, the use of fillers is optional. Fillers may include calcium carbonate, talc, mica, titania, fumed alumina, silica, clays, barium sulfate, and the like. The amount of filler present may vary from about 0.1% to about 50% by weight of the film formed from the polyester formulation. Fumed alumina is a commercially available alumina of extremely small particle size having diameters less than 1 micron, and preferably less than 0.5 micron. Mold parting agents may also be included.

In one modification, the polyester formulation may include a sufficient amount of electroconducting particles to render the film formed therefrom electroconducting. The electroconducting particles are preferably carbon but may be metal and have an average particle size up to about 0.5 millimeter although this value is not critical. The amount of electroconducting particles needed is easily determined by trial and error, but may range from about 0.5% to about 4% by weight of the polyester formulation. When the film is electroconducting, it tends to dissipate electrical charges that might otherwise accumulate on the surface of the molded body it covers. For example, a molded rotor vane for a fan can have an electroconducting film of the present invention.

It is understood that the polyester formulation may contain still other ingredients such as fire retardants and pigments which impart a desired color. Various inhibitors as hydroquinone and tert.-butyl catechol may be added to prevent premature gelatin and polymerization.

To prepare particles of the polyester formulation, the reaction mixture is first formed as an intimate mixture. All of the ingredients of the formulation are blended by conventional techniques, and the blend is passed through a mixing extruder having a temperature suitable to melt the resin, monomer, and other ingredients, where necessary, so that the extrudate is a thorough and homogenous mixture of the formulation. After solidifying, the extrudate is crushed and ground to a suitable size, for example, to an average particle size of about 70 to about 325 U.S. Standard sieve and preferably to an average particle size of about 100 U.S. Standard sieve.

PROCESS AND PRODUCT

The present invention contemplates the use of matching mold parts, such as a press mold, and especially a mold having intricate surface contours such as sharp bends, undulating or compound curves, deep draws, and the like. Normally, it is most difficult to mold products having acceptable surface finishes under such conditions, and particularly when sheet molding compound of inexpensive resins is used.

Particles of the polyester formulation are applied to a mold surface in carrying out the present process, and then heated so as to fuse the particles, whereupon they flow and spread out forming a substantially continuous and preferably wholly continuous film covering the mold surface. Preferably, the mold surface is heated prior to deposition of the polyester particles, for example, at about 300° F. to about 400° F., so that fusion and flow take place readily and as soon as reasonably possible.

The polyester particles may be applied to the mold by any convenient powder coating process, such as by airless techniques like dusting or spraying, but the particles are preferably applied by electrostatic means, including an electrostatic fluidized bed. The invention does not reside in any particular means of electrostatic deposition. Electrical guns, voltage and current conditions, and related techniques known in the art for electrostatic deposition can be used. The electrostatic spray gun disperses the charged coated powder as a cloud of particles which are directed by virtue of their charge and the output air pressure of the spray gun toward a grounded substrate. The substrate on which the deposition takes place is conveniently electroconducting, such as the grounded metal substrate of a metallic mold. Exemplary voltage of an electrostatic spray gun is about 30 kV to about 100 kV, direct current. The thickness of the polyester film is not critical, and the electrostatic application can be repeated if desired, to obtain a thicker film. Films having thicknesses of about 0.05 to about 5 millimeters are often used.

Following formation of the polyester film, the bulk or fill resin is added to the mold. Importantly, as the fill resin fills the mold, it flows across the pre-established polyester film without tearing or ripping it, even though the mold may have intricate contours, sharp bends, and the like. Although not fully cured, the film has sufficient integrity that it remains adhered to the mold surface, and there is independent movement of the fill resin relatively to the polyester film which remains fixed in place. Further, it is not necessary to pre-mold or pre-shape the fill resin. The described use of a polyester film also eliminates the need for a priming operation.

After addition of the fill resin the normal heating mold operation is carried out to advance the polyester resin of the film and the fill resin to a final cure. The fill resin may be any thermosetting resin desired, but, as indicated, is usually of the sheet molding compound variety.

Although, if desired, the polyester film may be fully cured and cross-linked prior to addition of the fill resin, it is preferred to maintain the polyester of the film in a partially cured state until the fill resin is added and then to cure both resins simultaneously to a final cure. In this manner, it is possible to react the two resins together when reactive chemical sites remain in the resins. This assures a tight chemical bond and strongly adheres the film to the resulting molded body. Time and temperature of final cure vary with resins used and conditions of use, but as a rule the mold may be heated for about 5 to about 40 minutes at about 300° F. to about 425° F. Most of the polyester formulations have a gel time of about 3 minutes at temperatures within the range of about 150° F. to about 190° F. and about 25 to about 40 seconds at 325° F., depending on the catalyst and other ingredients present.

When the molded product is removed from the mold, the polyester film defines the outer surface of the molded body with complete faithfulness to the mold configuration. The film provides an attractive, decorative, smooth surface with stability to solvents, for the film itself, contains no volatile matter at all. Significantly, the exposed surface of the molded body represented by the film has no skin blemishes, pits, sink marks, and the like, and the molded body appears to be of the same relatively expensive resinous composition throughout its interior. The film is homogenous and firmly adhered to the molded body.

The following examples only illustrate the invention and should not be construed as imposing limitations upon the claims.

EXAMPLE 1

This is an example of a polyester resin which may be used in practicing the invention. A partially cured, unsaturated polyester was prepared by the conventional esterification of the following ingredients:

|  | MOLES |
| --- | --- |
| Diethylene glycol | 1.0 |
| Propylene glycol | 3.6 |
| Phthalic anhydride | 2.6 |
| Maleic anhydride | 2.0 |

The polyester so prepared was dissolved in styrene to obtain a solution of about 40 parts by weight of styrene and about 60 parts by weight of the polyester. The styrene contained about 6% of benzoyle peroxide as a catalyst, about 0.5% by weight of an acrylate (Modoflow) as a flow agent, and about 140 parts per million by weight of hydroquinone as an inhibitor. The mixture was also blended with 9% by weight of an inert white pigment, titania.

EXAMPLE 2

Another formulation useful in the invention is in parts by weight:

| | |
| --- | --- |
| Polyester | 150 |

| -continued | |
|---|---|
| Divinyl phthalate | 100 |
| Benzoyl peroxide | 12.5 |
| Calcium carbonate | 50 |
| Zinc Stearate | 7 |

The polyester used was purchased under the trademark AROPOL 7200. The polyester, AROPOL 7501, could have been used also. These commercially available products are obtained by reacting propylene glycol or neopentyl glycol with isophthalic acid. Divinyl phthalate was the cross linker, while calcium carbonate served as a filler. Zinc stearate acted as a flow agent.

If it were desired to make a film from this formulation electroconducting, the formulation could include about 7 parts by weight of carbon black.

EXAMPLE 3

In use, particles of a partially cured polyester formulation of the type indicated by Examples 1 or 2, and prepared as previously described, were electrostatically sprayed along the interior of a heated female press mold which had a surface temperature of about 325° F. The polyester particles fused and, aided by the flow agent, spread and covered as a continuous film that area of the mold surface onto which they were sprayed.

A standard SMC resin was next added to the mold to fill it and the mold closed and heated at about 275° F. to about 325° F. for about 3 to about 10 minutes. When the mold was opened and the molded product removed, it had a smooth, attractive, blemish-free surface film that was for med from the polyester formulation.

Although the foregoing describes several embodiments of the present invention, it is understood that the invention may be practiced in still other forms within the scope of the following claims.

We claim:

1. A process for molding in a mold having relatively sharp bends and intricately curving, irregular surface contours a two-part bulk article comprising a sheet molding compound of relatively inferior physical properties, subject to exhibiting sink marks, porosity, waviness, pits, dimples, and the like after molding, defining the bulk of said article, and a resinous film of relatively superior physical properties, having little or no tears or film blemishes after molding, coating said sheet molding compound, said process comprising: coating the intricately curving, irregular surface contours of said mold while hot with particles of a partially cured, cross-linking polyester resin, substantially all of said particles containing within the particulate form said polyester resin, a catalytic amount of a peroxide catalyst, and a flow agent, causing said particles to fuse and bond from the heat of the mold and coalesce into a substantially continuous film coating said mold, said flow agent causing said polyester resin particles to flow along the mold after said fusing, filling the mold with a bulk, curable, organic sheet molding compound compatible with said polyester resin, and then heating the mold to cure said bulk fill resin to the shape of the mold and finally cure said polyester film while adhering the film to said molded bulk fill resin, said molded film having little or no tears or film blemishes in spite of the intricately curving irregular surface contours of the mold.

2. The process of claim 1 in which said coating is by electrostatic spraying.

3. The process of claim 1 in which said coating is by an airless spray.

4. The process of claim 1 in which said coating is by an electrostatic fluidized bed.

5. The process of claim 1 in which said mold is a female mold.

6. The process of claim 1 in which said particles have an average size of about 70 to about 325 U.S. Standard sieve.

7. The process of claim 1 in which said polyester resin is formed by reacting an organic glycol of about 2 to about 12 carbon atoms with a dicarboxylic acid of about 2 to about 16 carbon atoms or an anhydride thereof.

8. The process of claim 7 in which said polyester resin includes a cross-linking amount of a monomer selected from the group consisting of styrene, p-butylstyrene, vinyl toluene, methyl acrylate, methyl methacrylate, diallyl phthalate, acrylamide, diacetone acrylamide, divinyl phthalate, dimethyl fumerate, diethyl fumerate, diallyl chlorendate, diallyl malamine, and oligomers thereof.

9. The process of claim 1 in which said polyester resin is formed by reacting a glycol selected from the class consisting of propylene glycol and neopentyl glycol with isophthalic acid.

10. The process of claim 1 in which said polyester resin particles contain an inorganic, inert filler.

11. The process of claim 1 in which said polyester resin particles contain from about 0.1 percent to about 50 percent by weight of inorganic, inert filler selected from the group consisting of calcium carbonate, talc, mica, titania, fumed alumina, silica, clays, and barium sulfate.

12. The process of claim 1 in which said polyester resin particles contain from about 0.05 percent to about 10 percent by weight of a surface active agent as the flow agent effective to cause said polyester resin particles to flow along the mold after said fusing.

13. The process of claim 1 in which said film is about 0.05 mm to about 2 mm, in thickness.

14. A process for molding in a mold having relatively sharp bends and intricately curving, irregular surface contours a two part bulk particle comprising a sheet molding compound of relatively inferior physical properties and subject to exhibiting sink marks, porosity, waviness, pits, dimples, and the like after molding, defining the bulk of said article, and a resinous film of relatively superior physical properties, having little or no tears or film blemishes after molding, coating said sheet molding compound, said process comprising:
 (a) heating the mold to a temperature sufficient to fuse dry particles of a polyester resin as hereinafter defined,
 (b) electrostatically spraying the mold with substantially dry particles of a partially, cured, cross-linkable polyester resin to fuse said particles and cause them to flow and form a substantially continuous film on said mold, said sprayed particles having an average size of about 70 to about 325 U.S. Standard sieve,
 (c) said polyester resin particles containing within the particles themselves:
  (1) the reaction product of an organic glycol of about 2 to about 12 carbon atoms with a dicarboxylic acid of about 2 to about 16 carbon atoms or an anhydride thereof, a cross-linking amount of a monomer selected from the class consisting of styrene, vinyl toluene, methyl acrylate, methyl methacrylate, diallyl phthalate, acrylamide, diacetone acrylamide, divinyl phthalate, dimethyl fumarate, diethyl fumarate, diallyl chlorendate, diallyl melamine, and oligomers thereof, (2) a catalytic amount of a peroxide catalyst, (3) from about 0.05% to about 5% by weight of the polyester of a surface active agent as a flow agent effective to cause said polyester resin particles to flow along the mold after said fusing, (d) adding to the mold a heat-curable, bulk sheet molding compound compatible with said polyester resin, and (e) heating the mold simultaneously to completely cure the polyester film and the bulk molding compound and interract the bulk compound and polyester resin together to mold said bulk molding compound with a film thereabout of said polyester resin, said molded film having little or no tears or film blemishes in spite of the intricately curved, irregular surface contours of the mold.

15. The process of claim 14 in which said polyester resin comprises the reaction product of a glycol selected from the class consisting of polypropylene glycol and neopentyl glycol with isophthalic acid.

* * * * *

REEXAMINATION CERTIFICATE (1269th)
United States Patent [19]

Brueggemann et al.

[11] B1 4,205,028

[45] Certificate Issued  May 8, 1990

[54] FORMING PROTECTIVE SKIN ON INTRICATELY MOLDED PRODUCT

[75] Inventors: Walter H. Brueggemann, Chagrin Falls; John A. Brenner, Independence, both of Ohio

[73] Assignee: Ferro Corporation, Cleveland, Ohio

Reexamination Request:
No. 90/001,275, Jul. 1, 1987

Reexamination Certificate for:
Patent No.: 4,205,028
Issued: May 27, 1990
Appl. No.: 2,658
Filed: Jan. 11, 1979

[51] Int. Cl.$^5$ .............. B29C 41/08; B29D 9/00; B29K 67/00
[52] U.S. Cl. .................. 264/24; 264/126; 264/250; 264/255; 264/267; 264/269; 264/309; 264/338; 428/70; 428/482
[58] Field of Search .............. 264/24, 126, 250, 255, 264/267, 269, 309, 338, 347; 427/27, 195; 428/323, 482; 525/10, 27, 31; 416/241 A

[56] References Cited

U.S. PATENT DOCUMENTS

| | | | |
|---|---|---|---|
| Re. 28,068 | 7/1974 | Lemelson | 264/132 X |
| 2,781,553 | 2/1957 | Varela et al. | 264/255 |
| 3,216,877 | 11/1965 | Mohr | 156/230 |
| 3,504,063 | 3/1970 | Lemelson | 264/24 X |
| 4,001,153 | 1/1977 | Ogino et al. | 427/29 X |
| 4,012,363 | 3/1977 | Bruning et al. | 428/480 X |
| 4,135,009 | 1/1979 | Mercurio | 427/195 |
| 4,228,113 | 10/1980 | van Gasse | 264/24 |

FOREIGN PATENT DOCUMENTS 49-103958  8/1976  Japan .................. 428/480

*Primary Examiner*—Henry F. Epstein

[57] ABSTRACT

A molding process, resinous formulations for use in the process, and the resulting products are disclosed characterized in that the product comprises mainly a bulk or fill resinous body having a film or skin of a cross-linked polyester resin formed about the body. Even though the body has intricate curving surface contours, the film is smooth and free of surface tears and blemishes. The product is molded by first spraying formulated, dry particles of a partially cured polyester resin against a hot female mold to cause the particles to fuse and flow and form a substantially continuous skin or film on the female mold. Thereafter, the bulk resin is added and the mold is heated to cure the polyester resin as well as the bulk resin and to interreact the bulk and polyester resins together to mold the bulk resin with a film of the polyester resin.

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1 to 15 are cancelled.

* * * * *